United States Patent [19]

Topping et al.

[11] 4,199,340
[45] Apr. 22, 1980

[54] METHOD OF FORMING CORROSION-RESISTANT GLASSCERAMIC-TO-METAL SEALS

[75] Inventors: John A. Topping, Northfield, Ohio; Peter Mayer, Burlington, Canada

[73] Assignee: Her Majesty the Queen in right of Canada, as represented by the Minister of National Defence, Canada

[21] Appl. No.: 961,014

[22] Filed: Nov. 15, 1978

[30] Foreign Application Priority Data

Nov. 30, 1977 [CA] Canada .................................... 292073

[51] Int. Cl.$^2$ ...................... C03B 32/00; C03B 23/20; C03C 27/02
[52] U.S. Cl. ............................................. 65/32; 65/33; 65/40; 65/59 B; 65/59 R; 65/DIG. 4
[58] Field of Search ................. 65/32, 33, 59 B, 59 R, 65/DIG. 4, 40

[56] References Cited

U.S. PATENT DOCUMENTS

| | | | |
|---|---|---|---|
| 2,386,820 | 10/1945 | Spencer | 65/32 |
| 3,166,396 | 1/1965 | Millet et al. | 65/32 |
| 3,183,361 | 5/1965 | Bronson et al. | 65/32 X |
| 3,225,132 | 12/1965 | Baas et al. | 65/59 B X |
| 3,236,610 | 2/1966 | McMillan et al. | 65/59 R X |
| 3,240,661 | 3/1966 | Babcock | 65/59 R X |
| 3,371,413 | 3/1968 | Rundle | 65/59 B X |
| 3,490,886 | 1/1970 | Stoll | 65/32 |
| 3,540,957 | 11/1970 | Bawa et al. | 65/59 R X |
| 4,086,075 | 4/1978 | Ekkelboom et al. | 65/59 R X |
| 4,142,881 | 3/1979 | Louis | 65/59 B |

Primary Examiner—S. Leon Bashore
Assistant Examiner—Frank W. Miga
Attorney, Agent, or Firm—Cushman, Darby & Cushman

[57] ABSTRACT

Corrosion-resistant, hermetic glassceramic-to-metal seals are made in a single rapid heating step by inserting a glass preform made of 25–35% by weight ZnO, 2.5–10% by weight $Al_2O_3$ and 30–60% $SiO_2$ together with optional nucleating and/or fluxing agents, between a metal pin and surrounding metal collar. Heating is rapid in a single step to first fluidize the glass, while avoiding excessive oxidation of the metal pin and the metal collar and to prevent excessive interaction of the glass composition at the glass/collar interface, then to ceram the seal. The resulting seals exhibit good corrosion resistance to potassium hydroxide solutions and are useful in Ni-Cd batteries.

6 Claims, 4 Drawing Figures

METHOD OF FORMING CORROSION-RESISTANT GLASSCERAMIC-TO-METAL SEALS

BACKGROUND OF THE INVENTION

1. Field of the Invention

This invention relates to corrosion-resistant glassceramic-to-metal seals. In particular, the invention relates to plug seals for use in batteries. Plug seals are comprised of metal pin electrodes mounted by glassceramic-to-metal seals in surrounding metal collars.

The invention provides glass compositions for use in making corrosion-resistant, hermetic glassceramic-to-metal seals, as well as a method and apparatus for making plug seals.

The glass compositions for use in making corrosion-resistant, hermetic glassceramic-to-metal seals and having the property of sequentially fluidizing, sealing and ceraming during a single rapid heating step comprise about 25.0–32.0% by weight ZnO, about 2.5–10% by weight $Al_2O_3$ and about 30.0–60.0% by weight $SiO_2$ together with optimal fluxing and/or nucleating agents.

The method of making a hermetic plug seal having a metal pin electrode mounted by a corrosion-resistant glassceramic-to-metal seal in a surrounding metal collar comprises:

(a) positioning a glass composition preform between and in proximity to the pin and the collar, within a controlled atmosphere enclosure;

(b) rapidly heating the metal pin and collar to cause the glass preform to heat, by conduction and radiation, so that it flows between and adheres to the pin and collar, and then cerams; and (c) cooling the plug seal within the controlled atmosphere enclosure to room temperature.

The apparatus for making a hermetic plug seal having a metal pin electrode mounted by a corrosion-resistant glassceramic-to-metal seal in a surrounding metal collar comprises:

(a) a R.F. induction coil mounted about an oven body having gas inlet means and a loading port;

(b) a jig positionable within said oven body for holding a glass composition preform between and in proximity to the pin and the collar;

(c) a gas-permeable closure for sealing said loading port;

(d) a generator and source of power for said R.F. induction coil; and (e) a source of inert gas in communication with said gas inlet means.

2. Description of the Prior Art

Plug seals, such as are used in Ni-Cd batteries, are well known in the art. See for example Fairweather et al Canadian Pat. No. 1,000,353 issued Nov. 23, 1976.

Most prior art plug seals however, when used in a corrosive environment such as the 30% KOH aqueous electrolyte used in Ni-Cd batteries, failed prematurely and/or released contaminants into the cell.

Prior art methods of making plug seals having glassceramic-to-metal seals involved two basic steps. The first step was the formation of a bond between the metal and the glass. This was accomplished by heating the glass to a temperature sufficiently high to cause the glass to flow and form a fluid seal. The second step was the ceraming of the glass to form a glassceramic-to-metal seal. The ceraming typically involved two heating steps in order to convert the glass into a glassceramic by catalytic crystallization. In the first heating step, crystallization nuclei precipitated at temperatures slightly above the softening point of the glass. In the second step, the temperature was raised in order to decrease the viscosity of the glass so that crystal growth occurred and the glass transformed into a glassceramic.

In view of short plug seal life in corrosive environments, and the relative complexity and hence cost of manufacturing plug seals, a need has existed for improved plug seals which are simple in design and easy and inexpensive to manufacture.

It has been found that certain glass compositions based on the $ZnO$-$Al_2O_3$-$SiO_2$ system can be sequentially fluidized and ceramed in a single heating step to yield hermetic plug seals which exhibit good corrosion resistance in a KOH environment.

McMillan in "Glass Ceramics" (Academic Press, 1964) described glassceramics based on the $ZnO$-$Al_2O_3$-$SiO_2$ system as exhibiting high thermal expansion characteristics and electrical resistances. Subsequently, McMillan et al in "Glass Technology 7," pages 121 to 126, (1966) utilized glass compositions based on the $ZnO$-$Al_2O_3$-$SiO_2$ system in making glassceramic-to-metal seals.

It was not however previously recognized that certain selected compositions from the $ZnO$-$Al_2O_3$-$SiO_2$ system could be sequentially fluidized, sealed and ceramed in a single rapid heating step to yield plug seals exhibiting good corrosion resistance in a KOH environment.

SUMMARY OF THE INVENTION

The present invention provides glass compositions which can be sequentially fluidized and ceramed in a single rapid heating step to yield hermetic plug seals which exhibit good corrosion resistance in a KOH environment. Also provided is apparatus for use in making the plug seals.

In one particular aspect the present invention provides a glass composition for use in corrosion-resistant, hermetic glassceramic-to-metal seals, the composition having the property of sequentially fluidizing, sealing and ceraming during a single heating step, comprising about 25.0–32.0% by weight ZnO, about 2.5–10.0% by weight $Al_2O_3$ and about 30.0–60.0% by weight $SiO_2$.

In another aspect the present invention provides a method of making a hermetic plug seal having a metal pin electrode mounted by a corrosion-resistant, hermetic glassceramic-to-metal seal in a surrounding metal collar comprising the steps of:

(a) positioning a glass composition preform, said glass composition having the property of fluidizing, sealing and ceraming in a single rapid heating step, between and in proximity to the pin and the collar, within a controlled atmosphere enclosure;

(b) rapidly heating the metal pin and collar to cause the glass preform to heat and fluidize, by conduction and radiation, while preventing premature ceraming of the glass, so that the fluidized glass flows between and adheres to the pin and collar to form a fluid seal therebetween, and then cerams; and (c) cooling the plug seal within the controlled atmosphere enclosure to room temperature.

In a further aspect the present invention provides apparatus for use in making a hermetic plug seal having a metal pin electrode mounted by a corrosion-resistant glassceramic-to-metal seal in a surrounding metal collar comprising:

(a) a R.F. induction coil mounted about an oven body having gas inlet means and a loading port;

(b) a jig positionable within said oven body for holding a glass composition preform between and in proximity to the pin and the collar;

(c) a gas-permeable closure for sealing said loading port;

(d) a generator and source of power for said R.F. induction coil; and (e) a source of inert gas in communication with said gas inlet means.

BRIEF DESCRIPTION OF THE DRAWINGS

In drawings which illustrate aspects of the present invention.

DESCRIPTION OF THE PREFERRED EMBODIMENTS

Figure 2:
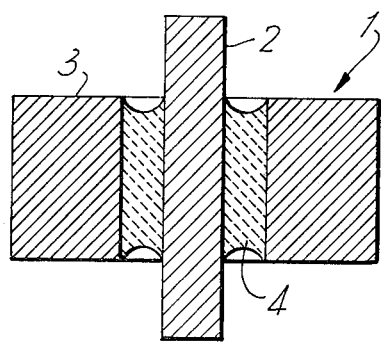
FIG. 2 is a cross-section of a plug seal along the lines 2—2 of FIG. 1.
Figure 1:
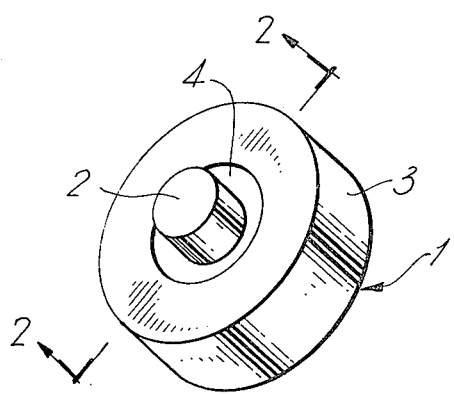
FIG. 1 is a perspective view of a plug seal according to the invention.

FIGS. 1 and 2 illustrate a hermetic plug seal 1 in which a metal pin electrode 2 is mounted in a metal collar 3 by glassceramic seal 4.

Suitable glass compositions for use in making the corrosion-resistant glassceramic seal 4 are from the $ZnO-Al_2O_3-SiO_2$ system, and generally comprise about 25.0 to 32.0% by weight ZnO, about 2.5 to 10.0% by weight $Al_2O_3$ and about 30.0 to 60.0% by weight $SiO_2$. The glass compositions normally include one or more fluxing and/or nucleating agents selected from the group consisting of CaO in an amount of up to about 10.0% by weight, PbO in an amount of up to about 14.5% by weight, $P_2O_5$ in an amount of up to about 2.5% by weight, $LiO_2$ in an amount of up to about 10% by weight, $Na_2O$ in an amount of up to about 3.0% by weight, $K_2O$ in an amount of up to about 3.0% by weight and $ZrO_2$ in an amount of up to about 12.5% by weight.

A particularly preferred glass composition comprises about 30.0% by weight ZnO, about 5.0% by weight $Al_2O_3$, about 40.0% by weight $SiO_2$, about 2.5% by weight CaO, about 5.5% by weight PbO, about 2.5% by weight $P_2O_5$, about 5% by weight $LiO_2$, about 3.0% by weight $Na_2O$, about 2.0% by weight $K_2O$ and about 4.5% by weight $ZrO_2$.

Another particularly preferred glass composition comprises about 30.0% by weight ZnO, about 5.0% by weight $Al_2O_3$, about 35.0% by weight $SiO_2$, about 2.5% by weight CaO, about 5.5% by weight PbO, about 2.5% by weight $P_2O_5$, about 5.0% by weight $LiO_2$, about 3.0% by weight $Na_2O$, about 2.0% by weight $K_2O$ and about 9.5% by weight $ZrO_2$.

Figure 3:
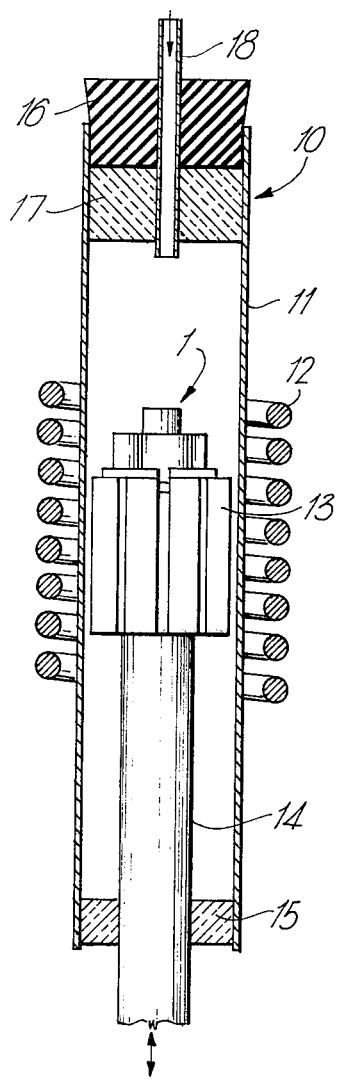
FIG. 3 is a schematic side view, partially in section, of apparatus according to the invention.

FIG. 3 illustrates a simple apparatus for use in making the plug seals. The apparatus includes an oven body 11 which may, for example, be a length of fused quartz or VYCOR ® tubing, about which is mounted a R.F. induction coil 12 which is connected to a suitable generator/power source (not shown). Oven body 11 and induction coil 12 are supported by suitable means (not shown) such as laboratory clamps, etc. In the embodiment illustrated, the upper end of oven body 11 is sealed by a stopper member 16 protected on its underside by a heat shielding layer 17 which, for example, may be a layer of FIBREFAX ®. A gas inlet 18 extends through stopper member 16 and heat shielding layer 17 and is connected to a source of inert gas (not shown). Within oven body 11 is a jig 13 which is adapted to hold the plug seal components in desired relationship during the sealing and ceraming process. Jig 13 is composed of a material suitable for use at the tempratures reached during the sealing and ceraming process. Satisfactory results have been obtained when jig 13 is made from VAREMCO ® 502–1300 machinable ceramic rod. Jig 13 is mounted upon a support rod 14 which in turn is mounted upon a laboratory jack or other suitable means (not shown) in order that jig 13 is movable between two positions. In one position, jig 13 is situated within oven body 11 essentially as illustrated in FIG. 3, at which position sealing and ceraming of the glass composition is carried out. In the other position, jig 13 is remote from oven body 11 for jig loading and unloading purposes. A gas-permeable seal 15 is mounted about support rod 14 at a location such that it seals oven body 11 below jig 13 when jig 13 is operatively positioned to effect sealing and ceraming of a glass composition. Gas-permeable seal 15, like the heat shielding layer 17, may be of FIBREFAX ®.

Figure 4:
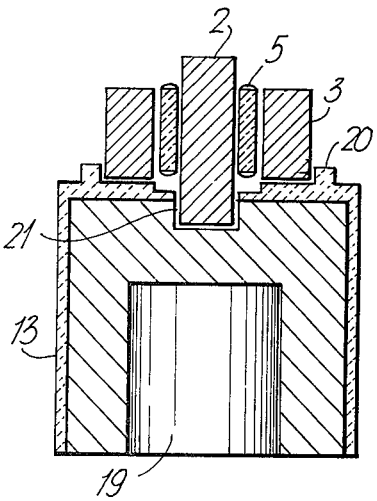
FIG. 4 is a cross-section of a jig and plug seal similar to those illustrated in FIG. 3.

FIG. 4 illustrates a jig 13 similar to that depicted in FIG. 3, upon which are mounted the component parts necessary to make a plug seal according to the present invention. Jig 13 has a lower bore 19 for purposes of mounting upon the support rod 14 of FIG. 3. The upper surface of jig 13 is provided with a lip 20 for retaining metal collar 3, and an axial bore 21 for retaining the lower end of metal pin 2. Between metal pin 2 and metal collar 3 is a glass composition preform 5 which, upon sealing and ceraming, becomes glassceramic seal 4 which is illustrated in FIGS. 1 and 2.

A typical sealing and ceraming operation to produce a plug seal according to the invention is as follows. Jig 13, in its position remote from oven body 11, is loaded with the pin 2, the collar 3 and the glass composition preform 5, essentially as illustrated in FIG. 4. In order to obtain a good glassceramic-to-metal seal each of the components, as will be understood by those skilled in the art, is matched for size, cleaned and dried prior to loading of the jig. The jig is then moved into its position within oven body 11 essentially as illustrated in FIG. 3, the lower end of the oven body being sealed by the gas-permeable seal 15. The interior of the oven body is next flushed with inert gas, for example, purified 4% $H_2-N_2$ or purified Ar. The purification can be carried out by passing the gas through columns filled with DRIERITE ® before and after passage through copper turnings heated to a temperature of about 600° C. Next, a R.F. magnetic field is generated by R.F. induction coil 12 which is connected to a generator/source of power (not shown). The application of R.F. power causes the metal parts to heat to the required sealing temperature. It will of course be obvious that suitable temperature sensing means can be employed in association with the oven body so that the application of R.F. power can be controlled to in turn provide temperature control. The glass composition preform 5 which is located between and in proximity to pin 2 and collar 3 is indirectly heated by conduction and radiation until the glass is sufficiently fluid to first flow and fill in the space between pin 2 and collar 3 and adhere to the metal parts, and then ceram to form the glassceramic seal 4 illustrated in FIGS. 1 and 2. The plug seal is then allowed to cool in the sealing atmosphere in the oven body to room temperature, a step typically requiring 15 to 20 minutes.

Rapid heating to the sealing temperatures is desired in order to prevent excessive oxidation of the metal pin and metal collar, particularly if oxygen potential in the sealing atmosphere is high, and to prevent excessive interaction of the glass composition, particularly at the glass/collar interface. It is preferable that the heating rate be sufficient to achieve sealing temperature in a period of less than about 5 minutes. The nature of the induction heating is such that the collar tends to heat preferentially with respect to the pin, such that overly rapid heating is unacceptable in that it causes the glass to melt and flow out at the collar while still cool at the pin. Too slow a heating rate must also be avoided in that it results in ceraming of the glass composition preform which prevents the glass from flowing to seal the space between the pin and collar.

Subsequent to manufacture of plug seals according to the invention, it is customary to chemically clean the plug seals to remove any scale formed upon the metal parts. The reasons for cleaning include the improvement of appearance, the removal of any scales which during service, for example in a Ni-Cd battery, could trap moisture and/or impurities, and the preparation of the metal pin surface for any subsequent plating step which might be carried out. A typical cleaning involves the following steps:

(i) the plug seals are immersed for 30 minutes in DIVERSEY ® Scale Conditioning Solution at a temperature of about 50° C. in order to loosen oxide scale;

(ii) loose scale is removed by treatment of the plug seals with DIVERSEY ® Scale Remover Solution and the plug seals are subsequently ultrasonically cleaned; and (iii) the appearance of the metal surfaces improved by immersion of the plug seals in DIVERSEY ® Stainless Steel Brightener for a period of about 15 minutes at a temperature of about 43° C.

Glass compositions useful for making glassceramic-to-metal seals according to the invention are those selected from the ZnO-Al$_2$O$_3$-SiO$_2$ system which seal and ceram respectively as a result of a single R.F. induction heating of the metal components of the seal.

As stated previously, the glass compositions broadly contemplated for use in the invention comprise about 25.0 to 32.0% by weight ZnO, about 2.5 to 10.0% by weight Al$_2$O$_3$ and about 30.0 to 60.0% by weight SiO$_2$, and normally include one or more fluxing or nucleating agents selected from the group consisting of CaO in an amount of up to about 10.0% by weight, PbO in an amount of up to about 14.5% by weight, P$_2$O$_5$ in an amount of up to about 2.5% by weight, LiO$_2$ in an amount of up to about 10% by weight, Na$_2$O in an amount of up to about 3.0% by weight, K$_2$O in an amount of up to about 3.0% by weight and ZrO$_2$ in an amount of up to about 12.5% by weight.

A particularly preferred glass composition comprises about 30.0% by weight ZnO, about 5.0% by weight Al$_2$O$_3$, about 40.0% by weight SiO$_2$, about 2.5% by weight CaO, about 5.5% by weight PbO, about 2.5% by weight P$_2$O$_5$, about 5% by weight LiO$_2$, about 3.0% by weight Na$_2$O, about 2.0% by weight K$_2$O and about 4.5% by weight ZrO$_2$. This composition is identified in the following Tables as Composition "7G."

Another particularly preferred glass composition comprises about 30.0% by weight ZnO, about 5.0% by weight Al$_2$O$_3$, about 35.0% by weight SiO$_2$, about 2.5% by weight CaO, about 5.5% by weight PbO, about 2.5% by weight P$_2$O$_5$, about 5.0% by weight LiO$_2$, about 3.0% by weight Na$_2$O, about 2.0% by weight K$_2$O and about 9.5% by weight ZrO$_2$. This composition is identified in the following Tables as Composition "8G."

Table 1 provides physical properties of the particularly preferred glass compositions and the corresponding glassceramics.

TABLE I

| Glass/ Glassceramic Composition | Glass Melting Temperature (°C.) | Glass Dilatometric Softening Point (0° C.) | Glassceramic Thermal Expansion $\alpha(\deg.^{-1})$ |
|---|---|---|---|
| 7G | 1100 | 685 | 86 |
| 8G | 1100 | 770 | 64 |

Table II sets out optimized condition for preparation, by R.F. induction heating, of plug seals according to the invention.

TABLE II

| Glass Composition | Collar Material | Pin Material | Sealing Temperature °C. | Sealing Time in Minutes | Sealing Atmosphere |
|---|---|---|---|---|---|
| 7G | 304L Stainless Steel | CERAMVAR ® | 1000 | 12 | Argon |
| 8G | 304L Stainless Steel | CERAMVAR ® | 1000 | 3.5 | Argon |

For satisfactory use in Ni-Cd batteries, plug seals should meet the following requirements:

(i) they must be hermetic, with a leak rate of less than $10^9$ cc He/sec;

(ii) the glassceramic seals must be electrically insulating, with a DC resistance greater than $10^9$ ohms;

(iii) the glassceramic seals must be strong, i.e. able to withstand a pressure of at least 300 psig; and (iv) the glassceramic seals must be resistant to corrosion in 30% KOH.

Plug seals prepared as set out in Table II were tested to ensure that they satisfied minimum requirements.

Hermeticity was measured by a VARIAN ® Helium Leak Detector, Model 925-40, in association with suitable apparatus for holding the plug seals. The results are set out in Table III, which follows.

Pin-to-collar electrical resistance of clean, dry plug seals was measured at room temperature using a General Radio Company No. 1644 Megaohm Bridge, with applied voltage of 500 volts DC and resistance readings taken 30 seconds after the application of voltage. The plug seals tested exceeded the required criteria.

Glassceramic seal strength was tested by applying water at a pressure of 800 psig against one side of the seal for a period of 30 minutes. The plug seals tested satisfactorily withstood the pressure, with no apparent ill effects.

Corrosion resistance was tested in a chamber partially filled with a 30% KOH aqueous solution and maintained under an internal pressure of 15 psig O$_2$. The chamber itself was partially immersed in a 40° C. oil bath, and the chamber intermittently rocked to periodically wet the glassceramic seal surfaces with the KOH solution. 1.5 volt dry cell batteries were utilized to apply a positive and negative voltage bias to the pin electrodes of the plug seals.

The corrosion-resistance of the glassceramic seals was determined by periodically removing the plug seals from the corrosion test apparatus and measuring the hermeticity in the manner described above. Pin-to-collar electrical resistance was also checked with the same periodicity as the corrosion-resistance determination.

The results of the corrosion test are also set out in Table III.

TABLE III

| Days in Test | 0 | | 20 | | 87 | |
|---|---|---|---|---|---|---|
| Plug Seal Glassceramic Composition | He Hermeticity (cc He/sec) | Resistance ($\Omega$) | He Hermeticity (cc He/sec) | Resistance ($\Omega$) | He Hermeticity (cc He/sec) | Resistance ($\Omega$) |
| 7G | $<10^{-9}$ | $>10^9$ | $<10^{-9}$ | $3.0 \times 10^7$ | $<10^{-9}$ | $5.0 \times 10^6$ |
| 8G | $<10^{-9}$ | $>10^9$ | $<10^{-9}$ | $8.0 \times 10^7$ | $<10^{-9}$ | $5.0 \times 10^6$ |

It was thus concluded that plug seals according to the teachings of Table II are particularly suitable for use in Ni-Cd batteries having a KOH electrolyte.

While FIG. 3 of the drawings illustrates a preferred shape of glass composition preform 5, it will be understood by those skilled in the art that the illustrated bevelling or chamfering of the preform ends is not absolutely necessary. Glass composition preforms can be prepared in ways well known in the prior art. The particular preforms utilized were prepared by inserting a dip rod, of selected diameter, into a desired glass composition melt to give a thin walled coating which slips off the dip rod following cooling to yield a cylindrical or tubular glass structure which is cut to length, if necessary, and then ground and polished to yield a preform of desired dimensions.

Modifications and variations which fall within the true broad spirit and scope of the invention will be obvious to those skilled in the art.

The embodiments of the invention in which an exclusive property or privilege is claimed are defined as follows:

1. A method of making a hermetic plug seal having a metal pin electrode mounted by a corrosion-resistant, hermetic glassceramic-to-metal collar, the seal exhibiting corrosion resistance in an environment of potassium hydroxide, said method comprising the steps of:

(a) positioning a glass composition preform, said glass composition having the property of sequentially fluidizing, sealing and ceraming in a single rapid heating step, between and in proximity to the pin and the collar, within an inert atmosphere enclosure, wherein the glass composition preform consists essentially of 25.0–32.0% by weight ZnO, 2.5–10.0% by weight $Al_2O_3$, 30.0–60.0% by weight $SiO_2$, 0–10% by weight CaO, 0–14.5% by weight PbO, 0–2.5% by weight $P_2O_5$, 0–10.0% by weight $LiO_2$, 0–3.0% by weight $Na_2O$, 0–3.0% by weight $K_2O$ and 0–12.5% by weight $ZrO_2$;

(b) rapidly heating in a single heating step the metal pin and collar to cause the glass preform to first heat, by conduction from the metal pin and the metal collar to the glass preform therebetween and radiation, to a temperature below the ceraming temperature of the glass and to fluidize the glass, so that the fluidized glass flows between and adheres to both the pin and collar to form a fluid seal therebetween, wherein the heating rate is sufficient to achieve sealing in a period of less than about 5 minutes while avoiding excessive oxidation of the metal pin and metal collar and to prevent excessive interaction of the glass composition at the glass-/collar interface, and when the temperature of the glass reaches about 1000° C. ceraming of the seal occurs;

(c) maintaining the temperature at about 1000° C. for about 3.5 to 12 minutes to effect ceraming of the seal; and thereafter (d) cooling the resulting plug seal within the inert atmosphere enclosure to room temperature.

2. A method according to claim 1, wherein the heating of step (b) is effected by R.F. induction.

3. A method according to claim 2, wherein the pin and collar are cleaned prior to step (a), and the enclosure is flushed with dry, inert gas prior to step (b).

4. A method of making a hermetic plug seal for use in a Ni-Cd battery, the seal having a metal pin electrode mounted in and surrounded by a corrosion-resistant, hermetic glassceramic-to-metal seal in a surrounding metal collar, the seal exhibiting corrosion resistance under an environment of potassium hydroxide, said method including the successive steps of:

(a) positioning a glass composition preform about said metal pin electrode and within said surrounding metal collar, said glass composition preform consisting essentially of, in percent by weight:
    ZnO: 25.0–32.0%
    $Al_2O_3$: 2.5–10.0%
    $SiO_2$: 30.0–60.0%
    CaO: 0–10%
    PbO: 0–14.5%
    $P_2O_5$: 0–2.5%
    $LiO_2$: 0–10%
    $Na_2O$: 0–3%
    $K_2O$: 0–3%
    $Zr_2O$: 0–12.5%,
    said glass composition capable of sequentially fluidizing, sealing and ceraming in a single rapid heating step;

(b) rapidly heating by R.F. induction in an inert atmosphere said metal pin electrode, glass preform and surrounding metal collar in a single heating step to a temperature initially below the ceraming temperature of the glass to sequentially fluidize, seal then ceram the glass preform, such that (i) the fluidized glass flows between and adheres to the electrode pin and surrounding collar to form a fluid seal therebetween while avoiding excessive oxidation of the metal pin and metal collar and to prevent excessive interaction of the glass composition at the glass/collar interface, the rate of heating sufficient to achieve sealing in a period of less than about 5 minutes, and (ii) ceraming of the seal occurs when the temperature of the glass reaches about 1000° C.;

(c) maintaining the temperature at about 1000° C. for a period of about 3.5 to about 12 minutes to effect ceraming of the seal; and thereafter (d) cooling the resulting hermetic plug seal in said inert atmosphere to room temperature.

5. The method according to claim 4 wherein said glass preform composition consists essentially, in percent by weight, of:

ZnO: about 30%
$Al_2O_3$: about 5%
$SiO_2$: about 40%
CaO: about 2.5%
PbO: about 5.5%
$P_2O_5$: about 2.5%
$LiO_2$: about 5%
$Na_2O$: about 3%
$K_2O$: about 2% and
$Zr_2O$: about 4.5%.

6. The method according to claim 4 wherein said glass preform composition consists essentially, in percent by weight, of:

ZnO: about 30%
$Al_2O_3$: about 5%
$SiO_2$: about 35%
CaO: about 2.5%
PbO: about 5.5%
$P_2O_5$: about 2.5%
$LiO_2$: about 5%
$Na_2O$: about 3%
$K_2O$: about 2% and
$Zr_2O$: about 9.5%.

* * * * *